(12) United States Patent
Tsai et al.

(10) Patent No.: US 10,990,125 B1
(45) Date of Patent: Apr. 27, 2021

(54) COMPUTER

(71) Applicant: Quanta Computer Inc., Taoyuan (TW)

(72) Inventors: Wen-Hung Tsai, Taoyuan (TW);
Gwo-Chyuan Chen, Taoyuan (TW);
Chi-Jen Yu, Taoyuan (TW); I-Chi Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/829,383

(22) Filed: Mar. 25, 2020

(30) Foreign Application Priority Data

Dec. 26, 2019 (TW) .................. 108217239

(51) Int. Cl.
*G06F 1/16* (2006.01)

(52) U.S. Cl.
CPC .......... *G06F 1/1618* (2013.01); *G06F 1/1641* (2013.01); *G06F 1/1662* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,278,779 A * | 1/1994 | Conway | ................ | G06F 1/1616 341/20 |
| 6,016,176 A * | 1/2000 | Kim | ..................... | G06F 1/1683 349/84 |
| 6,262,785 B1 * | 7/2001 | Kim | ..................... | G06F 1/1641 349/58 |
| 6,665,173 B2 * | 12/2003 | Brandenberg | ........ | G06F 1/1613 361/679.09 |
| 6,813,143 B2 * | 11/2004 | Makela | ................ | G06F 1/1622 361/679.08 |
| 6,829,139 B1 * | 12/2004 | Duarte | ................ | H04M 1/0237 361/679.02 |
| 6,856,507 B2 * | 2/2005 | Chen | ..................... | G06F 1/1616 235/145 R |
| 7,016,182 B2 * | 3/2006 | Brandenberg | ........ | G06F 1/1613 361/679.06 |
| 7,149,557 B2 * | 12/2006 | Chadha | ............... | H04M 1/0202 455/575.1 |
| 7,187,364 B2 * | 3/2007 | Duarte | ................... | G06F 1/162 345/156 |
| 7,235,738 B2 * | 6/2007 | Horinouchi | ............. | A63F 13/08 174/50 |
| 7,280,346 B2 * | 10/2007 | Lewis | ................... | G06F 3/0238 361/679.01 |
| 7,446,757 B2 * | 11/2008 | Mochizuki | ............ | G06F 1/1616 345/168 |
| 7,652,873 B2 * | 1/2010 | Lee | ....................... | E05B 65/006 361/679.06 |
| 7,715,191 B2 * | 5/2010 | Leung | ................. | H04M 1/0208 361/679.56 |

(Continued)

*Primary Examiner* — Lisa Lea-Edmonds
(74) *Attorney, Agent, or Firm* — McClure, Qualey & Rodack, LLP

(57) ABSTRACT

A computer is provided, including a keyboard, a rotating plate, a pivot shaft and a screen. The rotating plate is movably disposed on the keyboard. The pivot shaft is connected to the rotating plate, and is movable relative to the keyboard. The screen is connected to the pivot shaft to move relative to the rotating plate.

9 Claims, 15 Drawing Sheets

(56) References Cited

U.S. PATENT DOCUMENTS

| | | | | |
|---|---|---|---|---|
| 7,864,524 B2* | 1/2011 | Ladouceur | G06F 3/0221 | 361/679.55 |
| 7,881,055 B2* | 2/2011 | Brandenberg | H04M 1/0235 | 361/679.3 |
| 8,037,121 B2* | 10/2011 | Duarte | H04M 1/0212 | 709/200 |
| 8,072,427 B2* | 12/2011 | Pletikosa | G06F 1/1622 | 345/169 |
| 8,185,169 B2* | 5/2012 | Griffin | H04M 1/0247 | 455/575.3 |
| 8,199,465 B2* | 6/2012 | Shen | H04M 1/0227 | 361/679.01 |
| 8,467,184 B2* | 6/2013 | Chen | G06F 1/162 | 361/679.55 |
| 8,488,778 B2* | 7/2013 | Rubin | H04M 1/0237 | 379/433.12 |
| 8,539,705 B2* | 9/2013 | Bullister | G06F 1/1615 | 40/733 |
| 8,564,936 B2* | 10/2013 | Ejima | H04M 1/0237 | 361/679.01 |
| 8,599,545 B2* | 12/2013 | Walker | G06F 1/1622 | 361/679.27 |
| 8,654,518 B2* | 2/2014 | Wei | G06F 1/162 | 361/679.02 |
| 8,687,376 B2* | 4/2014 | Travis | G06F 1/1622 | 361/755 |
| 8,730,658 B2* | 5/2014 | Oshima | G06F 1/1624 | 361/679.3 |
| 8,861,187 B2* | 10/2014 | Takahashi | G06F 1/162 | 361/679.06 |
| 10,057,998 B1* | 8/2018 | Jiang | H05K 1/028 | |
| 2005/0207104 A1* | 9/2005 | Love | G06F 1/1681 | 361/679.07 |
| 2006/0268500 A1* | 11/2006 | Kuhn | G06F 1/1616 | 361/679.04 |
| 2009/0275366 A1* | 11/2009 | Schilling | G06F 1/1654 | 455/566 |
| 2014/0125553 A1* | 5/2014 | Kim | G06F 1/1647 | 345/1.3 |
| 2019/0258295 A1* | 8/2019 | Fujimoto | G09F 9/00 | |

* cited by examiner

COMPUTER

CROSS REFERENCE TO RELATED APPLICATIONS

This application claims priority of Taiwan Patent Application No. 108217239 filed on Dec. 26, 2019, the entirety of which is incorporated by reference herein.

BACKGROUND OF THE DISCLOSURE

Field of the Disclosure

The present disclosure relates to a computer, and more specifically, the present disclosure relates to a computer with a rotatable screen.

Description of the Related Art

With the development of different markets, computers are gradually becoming thinner and lighter for ease of carrying and moving. However, market demand is rising for larger computer screens. However, a large screen reduces the convenience of carrying and moving the computer. Today's computers must make a trade-off between being thin and light, and having large screens. They cannot have both. Therefore, there is a need for a computer that has a large screen but is easy to carry and move at the same time to solve the existing problems.

BRIEF SUMMARY OF THE DISCLOSURE

The present disclosure provides a computer, including a keyboard, a rotating plate, a pivot shaft and a screen. The rotating plate is movably disposed on the keyboard. The pivot shaft is connected to the rotating plate, and is movable relative to the keyboard. The screen is connected to the pivot shaft to move relative to the rotating plate.

The present disclosure also provides a computer, wherein the keyboard includes a first protrusion and a second protrusion, the rotating plate includes a first groove and a second groove, the first protrusion is inserted into the first groove, the second protrusion is inserted into the second groove to restrict the movement of the rotating plate relative to the keyboard. The first protrusion includes a first protrusion head, the second protrusion includes a second protrusion head, and a size of the first protrusion head is larger than a size of the first groove, a size of the second protrusion head is larger than a size of the second groove. The keyboard includes a keyboard recess portion, the keyboard recess portion has a recess portion side, the rotating plate includes a rotating plate long side, and the rotating plate long side abuts the recess portion side.

The present disclosure also provides a computer, wherein the screen includes a first screen portion, a second screen portion and a screen pivot shaft. The second screen portion is connected to the pivot shaft. The screen pivot shaft is connected to the first screen portion and the second screen portion. The first screen portion rotates relative to the second screen portion by the screen pivot shaft. The area of the first screen portion is substantially the same as the area of the keyboard, and the area of the second screen portion is substantially the same as the area of the keyboard. The keyboard has a first side, the second portion has a side, and when the first screen portion is in contact with the keyboard, the first side is parallel to the side. The keyboard has a keyboard bottom surface, the second screen portion includes a back case, and the keyboard bottom surface is in contact with the back case by rotating the pivot shaft. The screen further includes a third screen portion connected to the first screen portion, the second screen portion and the screen pivot shaft, and the first screen portion rotates relative to the third screen portion by the screen pivot shaft. The screen pivot shaft has a groove, and when the first screen portion is in contact with the keyboard, the groove accommodates a portion of the third screen portion.

BRIEF DESCRIPTION OF THE DRAWINGS

In order to describe the manner in which the above disclosure and its advantages and features may be obtained, a more detailed description of the above principles will be presented by referring to specific examples illustrated in the accompanying drawings. These drawings only illustrate the exemplary aspects of the present disclosure and should therefore not be considered as limiting the scope of this disclosure. These principles are described and explained with additional features and details by using the following drawings.

DETAILED DESCRIPTION OF THE DISCLOSURE

Figure 1:
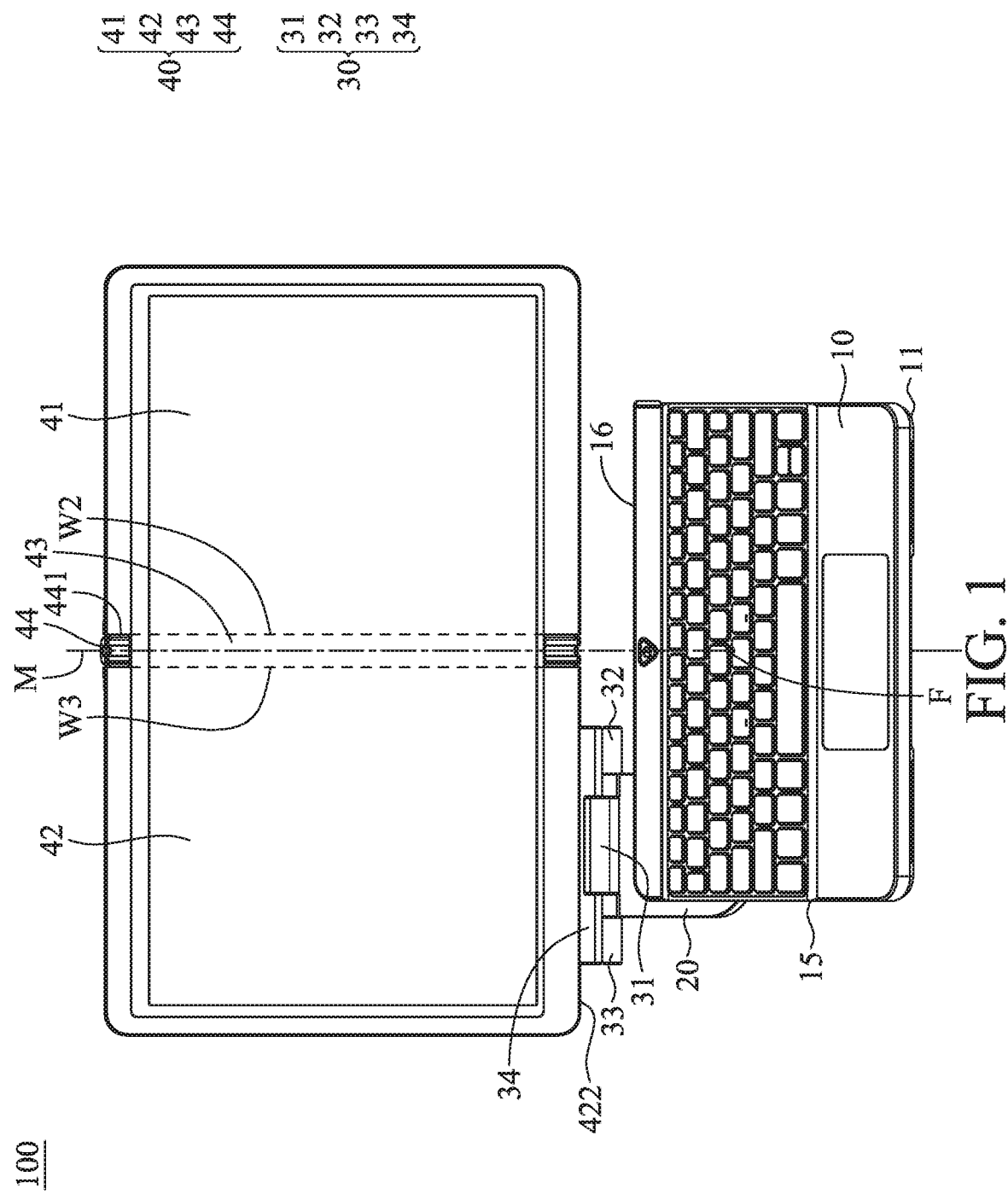
FIG. 1 illustrates a perspective view of a computer according to some embodiments of the present disclosure.

The present disclosure is described with reference to the drawings, in which the same reference numerals are used throughout the drawings to indicate the similar or identical elements. The drawings are not drawn to scale, and the drawings are disposed for illustration present disclosure only. The followings describe several aspects of the present disclosure with reference to illustrative exemplary applications. It should be noted that many specific details, relationships, and methods are elaborated to provide a complete understanding of the present disclosure. However, a person ordinary skilled in the art to which the present disclosure belongs will easily understand that the present disclosure may be practiced without one or more specific details or in other ways. In other cases, well-known structures or operations are not shown in detail to avoid obscuring the present disclosure. The present disclosure is not limited to the orders illustrated by the shown actions or events, as some actions may occur in different orders and/or occur with other actions or events. In addition, not all the shown actions or events are required to apply the method according to the present disclosure.

Unless otherwise defined, all terms (including technical terms and scientific terms) used herein have the same meanings as commonly understood by a person ordinary skilled in the art to which the present disclosure belongs. In addition, the terms (for example, the terms defined in commonly used dictionaries) should be interpreted to have a consistent meaning in the context of the relevant field, and unless explicitly defined as such, they are not intended to be idealized or too formal understanding.

Please refer to FIG. 1, a computer 100 of the present disclosure includes a keyboard 10, a rotating plate 20, a pivot shaft 30 and a screen 40.

Figure 2:
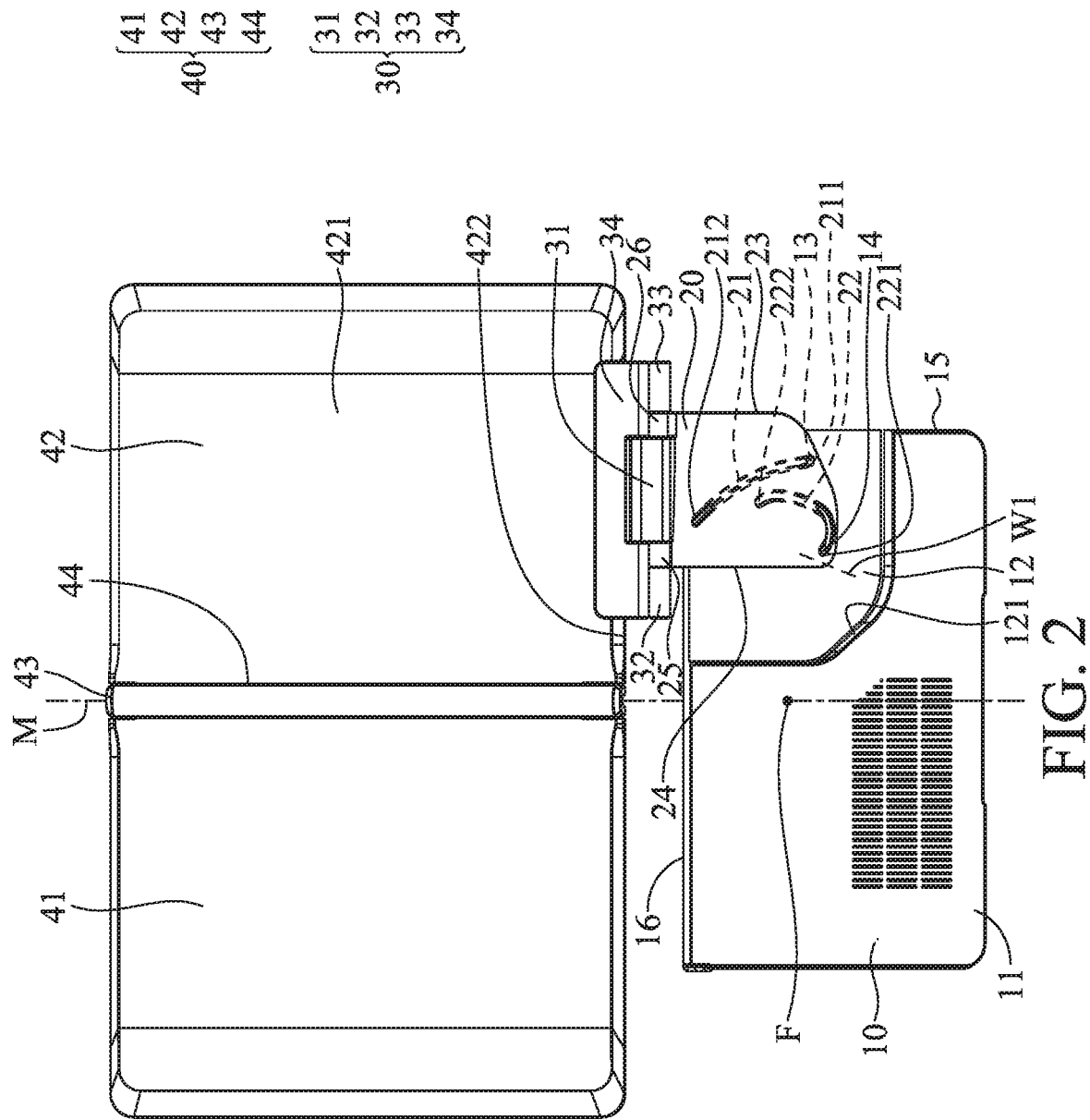
FIG. 2 illustrates a perspective view of the computer from another view according to some embodiments of the present disclosure.
Figure 3:
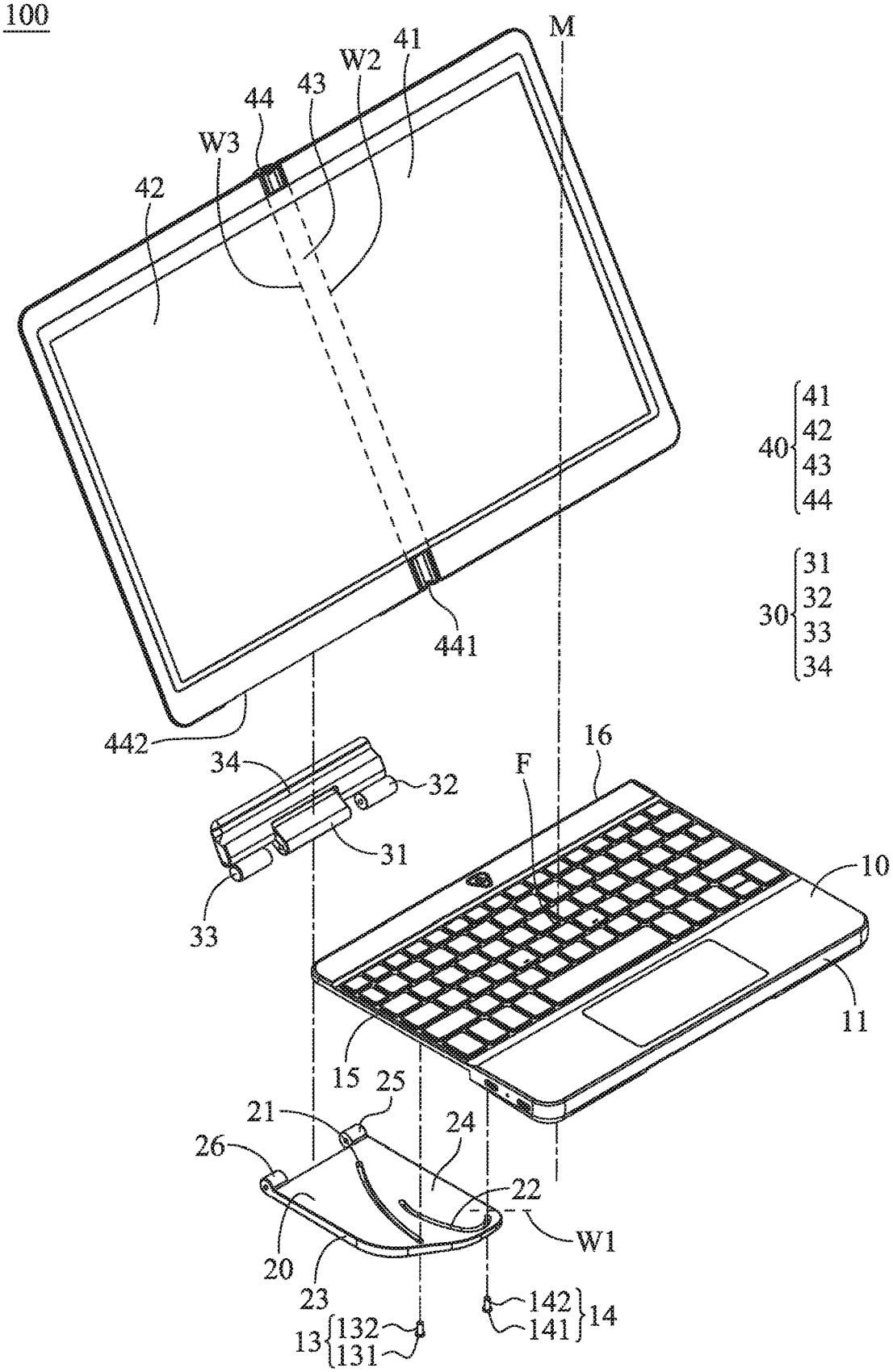
FIG. 3 illustrates an exploded view of the computer according to some embodiments of the present disclosure.

Please refer to FIG. 2, the keyboard 10 has a keyboard bottom surface 11, a keyboard recess portion 12, a first protrusion 13, a second protrusion 14, a first side 15, a second side 16, a center F, and a central axis M. The keyboard recess portion 12 is located on the keyboard bottom surface 11, and has a recess portion side 121. Please refer to FIG. 2 and FIG. 3 at the same time, the first protrusion 13 and the second protrusion 14 are disposed in the keyboard recess portion 12. The first protrusion 13 includes a first protrusion head 131 and a first protrusion post 132. The second protrusion 14 includes a second protrusion head 141 and a second protrusion post 142. The first protrusion head 131 is connected to the keyboard recess portion 12 via the first protrusion post 132. The second protrusion head 141 is connected to the keyboard recess portion 12 via the second protrusion post 142. The central axis M penetrates the center F and is perpendicular to the first side 15 and the second side 16.

As shown in FIG. 2, the rotating plate 20 is movably disposed on the keyboard 10. The rotating plate 20 includes a first groove 21, a second groove 22, a rotating plate long side 23, a rotating plate straight side 24, a first protrusion portion 25, and a second protrusion portion 26. It should be noted that the portion indicated by the dashed line represents the portion that is actually shielded by other elements. The first protrusion post 132 (refer to FIG. 3) of the first protrusion 13 is inserted into the first groove 21, and the second protrusion post 142 (refer to FIG. 3) of the second protrusion 14 is inserted into the second groove 22. The first groove 21 has a first sidewall 211 and a second sidewall 212, and the second groove 22 also has a first sidewall 221 and a second sidewall 222. The size of the first protrusion head 131 is larger than the size of the first groove 21 (please refer to FIG. 3) to avoid the first protrusion 13 separating from the first groove 21. The size of the second protrusion head 141 is larger than the size of the second groove 22 (please refer to FIG. 3) to avoid the second protrusion 14 separating from the second groove 22. The first protrusion post 132 may abut the first sidewall 211 and second sidewall 212, to limit the rotating plate 20 with respect to the keyboard 10 to move. The second protrusion post 142 may abut the first sidewall 221 and the second sidewall 222 to limit the movement of the rotating plate 20 relative to the keyboard 10. The rotating plate long side 23 is a long side of the rotating plate 20 that extends from the second protrusion portion 26 and terminates at the rotating plate straight side 24 of the rotating plate 20 extends from the first protrusion portion 25. The rotating plate long side 23 and the rotating plate straight side 24 are bounded by a dashed line W1.

As shown in FIG. 2, the pivot shaft 30 is connected to the rotating plate 20 to move relative to the keyboard 10. The pivot shaft 30 includes a pivot body 31, a first rotating plate connecting portion 32, a second rotating plate connecting portion 33, and a screen connecting portion 34. The pivot body 31 is pivotally connected to the first protrusion portion 25 and the second protrusion portion 26 of the rotating plate 20 and the screen connection portion 34. Therefore, the screen connecting portion 34 may rotate relative to the pivot body 31, and the first protrusion portion 25 and the second protrusion portion 26 may also rotate relative to the pivot body 31. The first rotating plate connecting portion 32 is pivotally connected to the first protrusion portion 25. The second rotating plate connecting portion 33 is pivotally connected to the second protrusion portion 26. Therefore, the rotating plate 20 may rotate relative to the first rotating plate connecting portion 32 and the second rotating plate connecting portion 33.

As shown in FIG. 1, the screen 40 is connected to the pivot shaft 30 to move relative to the rotating plate 20. The screen 40 includes a first screen portion 41, a second screen portion 42, a third screen portion 43, and a screen pivot shaft 44. The third screen portion 43 and the first screen portion 41 are bounded by a dashed line W2, and the dashed line W2 is a dashed line that the side of the screen pivot shaft 44 abuts the first screen portion 41 mapped to screen 40. Moreover, the third screen portion 43 and the second screen portion 42 are bounded by a dashed line W3, and the dashed line W3 is a dashed line that the side of the screen pivot shaft 44 abuts the third screen portion 43 mapped to screen 40. The second screen portion 42 includes a back case 421 (please refer to FIG. 2) and a side 422. The screen pivot shaft 44 has a groove 441. The first screen portion 41 is connected to the third screen portion 43, and the second screen portion 42 is connected to the third screen portion 43, but the first screen portion 41 is not directly connected to the second screen portion 42. The second screen portion 42 is connected to the screen connection portion 34 of the pivot shaft 30. The screen pivot shaft 44 is connected to the first screen portion 41, the second screen portion 42 and the third screen portion 43. The first screen portion 41 may rotate relative to the second screen portion 42 and the third screen portion 43 by the screen pivot shaft 44, and the third screen portion 43 may rotate relative to the second screen portion 42 by the screen pivot shaft 44. It should be noted that the area of the first screen portion 41 is substantially the same as the area of the keyboard 10, and the area of the second screen portion 42 is substantially the same as the area of the keyboard 10. That is, the area of the first screen portion 41 is substantially the same as the area of the second screen portion 42, and the area of the screen 40 is more than twice the area of the keyboard 10.

Figure 4A:
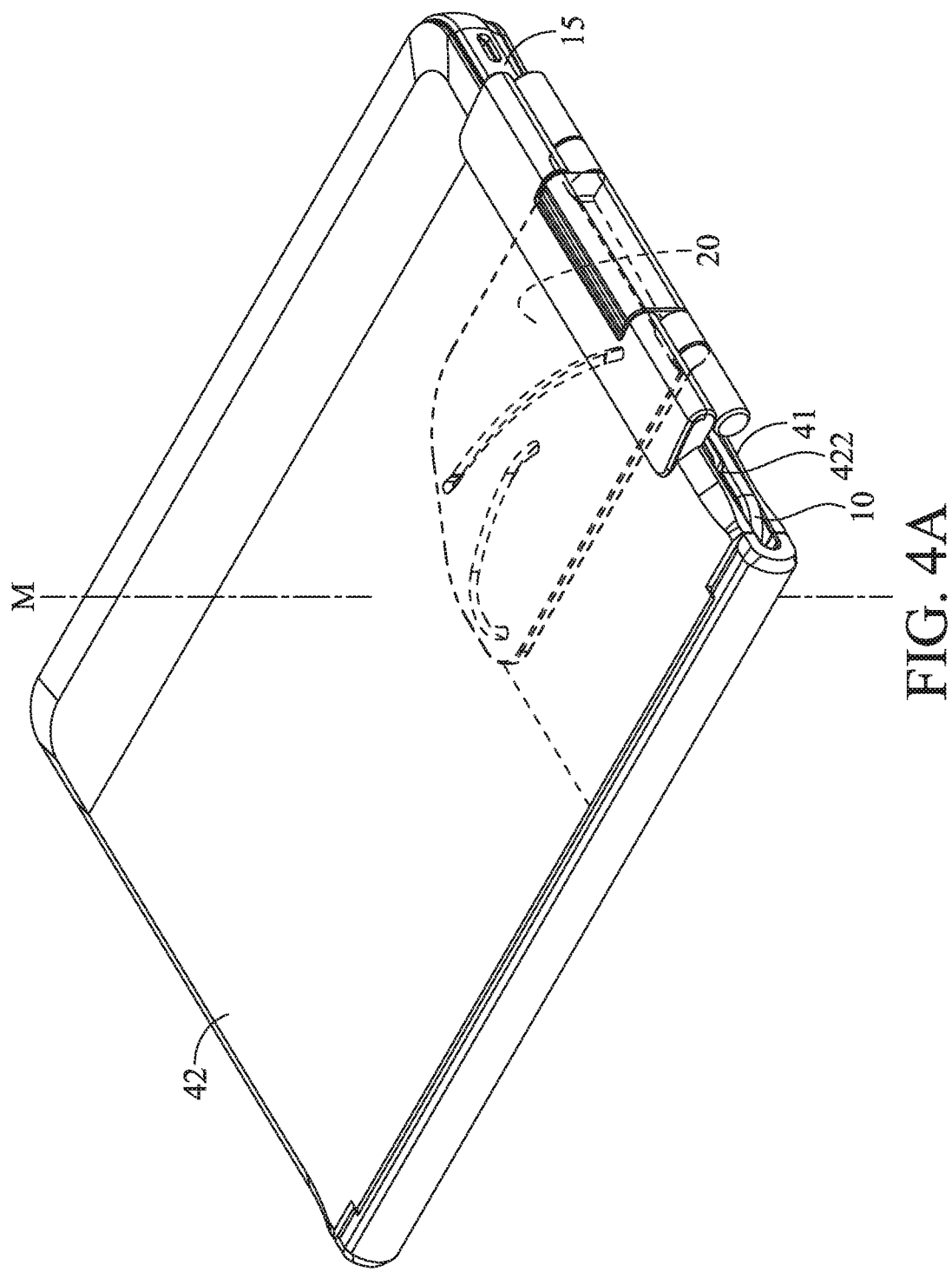
FIG. 4A illustrates a perspective view of the computer in a completely closed state according to some embodiments of the present disclosure.

Please refer to FIG. 4A, FIG. 4A is a schematic view of the computer 100 in a completely closed state. In the completely closed state, the second screen portion 42, the keyboard 10, the rotating plate 20 (shown in a dashed line) and the first screen portion 41 are sequentially arranged and overlap each other. In the completely closed state, the first screen portion 41 is in contact with the keyboard 10, and the second screen portion 42 is in contact with the keyboard 10 and the rotating plate 20. Please refer to FIG. 4B, when the computer 100 is in the completely closed state, the groove 441 of the screen pivot shaft 44 accommodates a portion of the third screen portion 43.

Figure 4B:
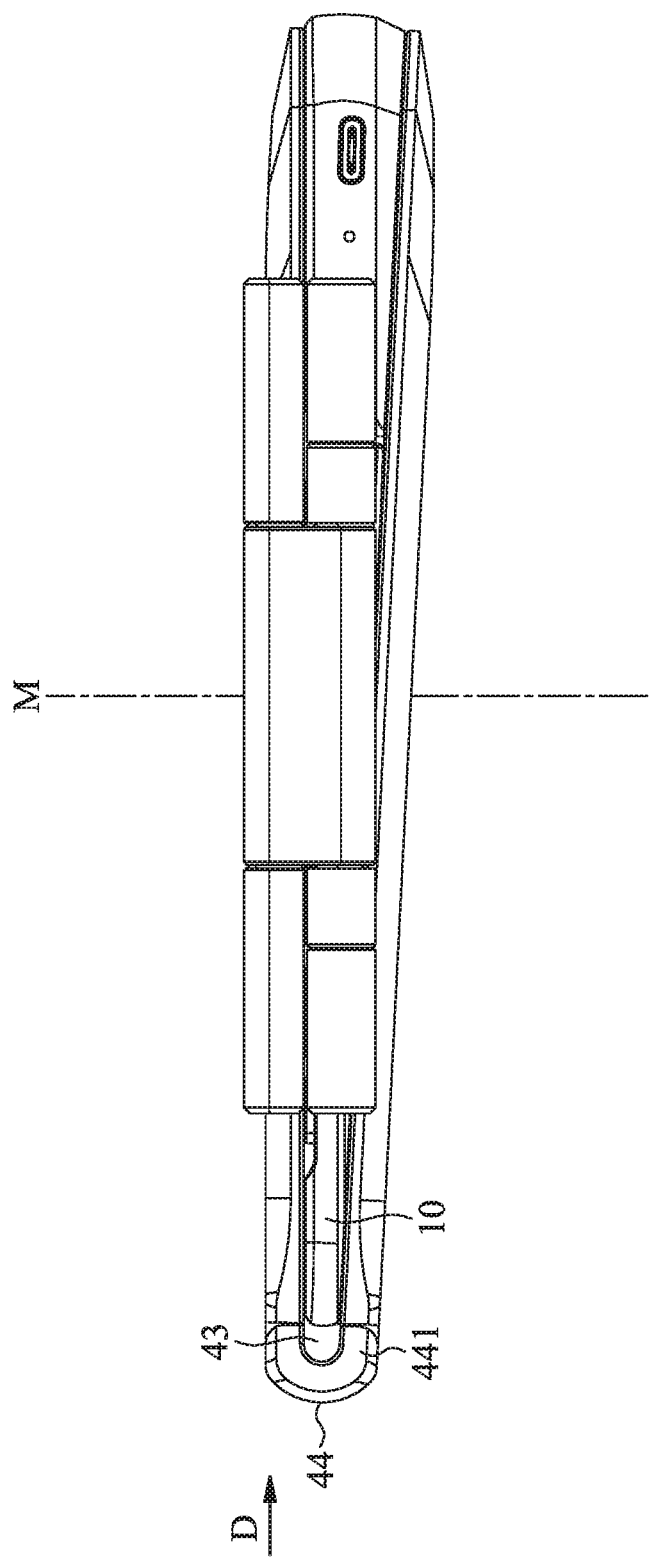
FIG. 4B illustrates a perspective view of the computer in the completely closed state from another view according to some embodiments of the present disclosure.

Please refer to FIG. 4A and FIG. 4B, the screen pivot shaft 44, the third screen portion 43 and the keyboard 10 are sequentially arranged and overlap each other when observed in a direction D perpendicular to the central axis M. In the completely closed state, the side 422 of the second screen portion 42 is parallel to the first side 15 of the keyboard 10. Moreover, in the completely closed state, the first screen portion 41 and the second screen portion 42 are not coplanar with the third screen portion 43. That is, in the completely closed state, the screen 40 of the computer 100 is unexpanded.

Figure 4C:
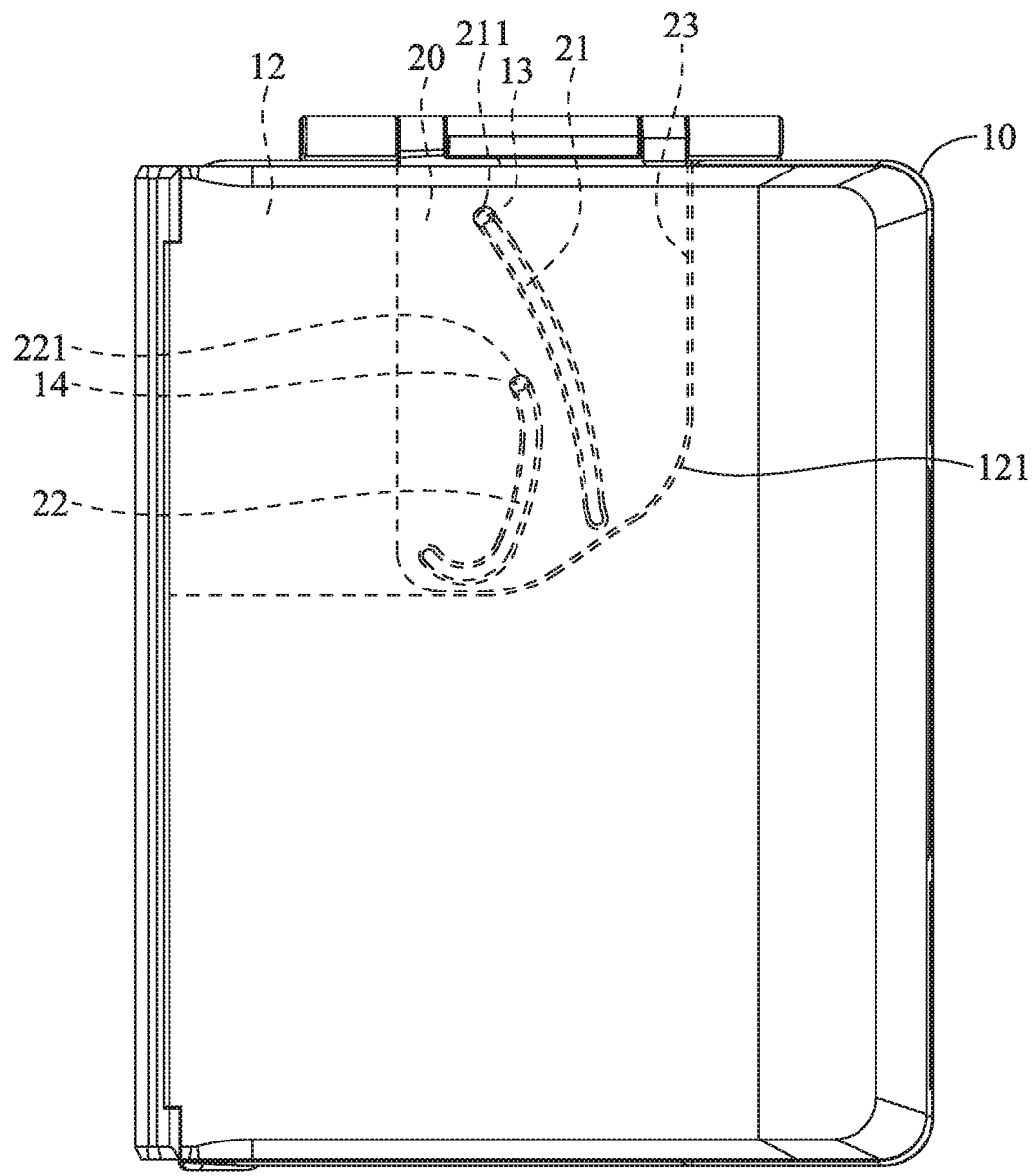
FIG. 4C illustrates a bottom view of the computer in the completely closed state according to some embodiments of the present disclosure.

Please refer to FIG. 4C, when the computer 100 is in the completely closed state, the first protrusion 13 of the keyboard 10 abuts the first sidewall 211 of the first groove 21 of the rotating plate 20, and the second the protrusion 14 of the keyboard 10 abuts the first sidewall 221 of the second groove 22 of the rotating plate 20. Further, the rotating plate long side 23 of the rotating plate 20 abuts the recess portion side 121 of the keyboard recess portion 12. It should be noted that the portion indicated by the dashed line represents the portion that is actually shielded by other elements.

Figure 5A:
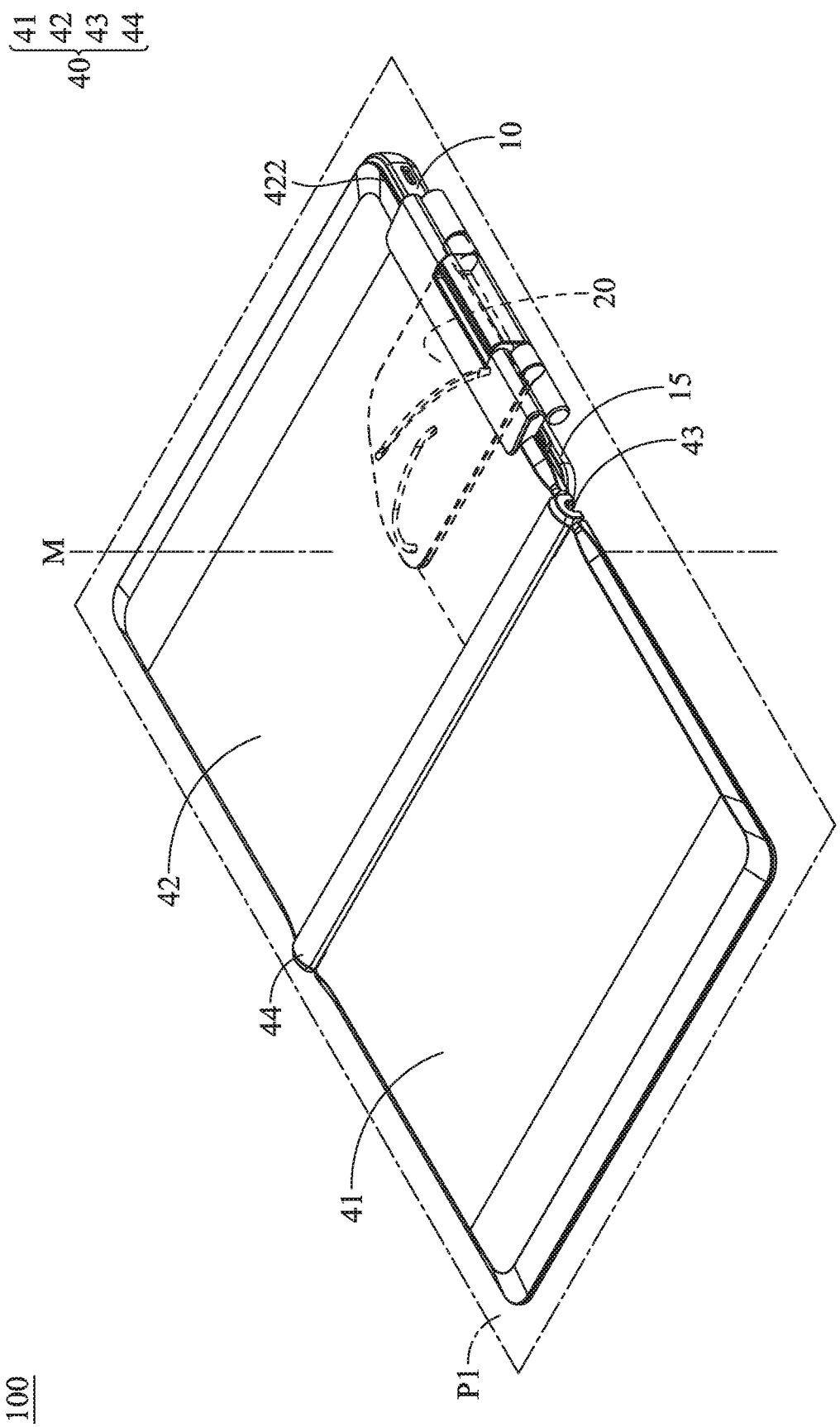
FIG. 5A illustrates a perspective view of the computer in a partially closed state according to some embodiments of the present disclosure.

Please refer to FIG. 5A, FIG. 5A is a schematic view of the computer 100 in a partially open state. The computer 100 may transform between the completely closed state shown in FIG. 4A, FIG. 4B and FIG. 4C and the partially open state shown in FIG. 5A by rotating the screen pivot shaft 44.

As shown in FIG. 5A, when the computer 100 is in the partially closed state, the second screen portion 42, the keyboard 10, the keyboard 10 and the rotating plate 20 are sequentially arranged and overlap each other and are penetrated by the central axis M when observed along the central axis M. Moreover, the screen pivot shaft 44 and the third screen portion 43 overlap each other when observed along the central axis M.

Please continue to refer to FIG. 5A, in the partially closed state, the side 422 of the second screen portion 42 is parallel to the first side 15 of the keyboard 10. Further, in the partially closed state, the first screen portion 41, the second screen portion 42 and the third screen portion 43 are located on a first plane P1, and the first plane P1 is substantially parallel to the keyboard 10. That is, the screen 40 is in contact with the keyboard 10, and the screen 40 is expanded.

Figure 5B:
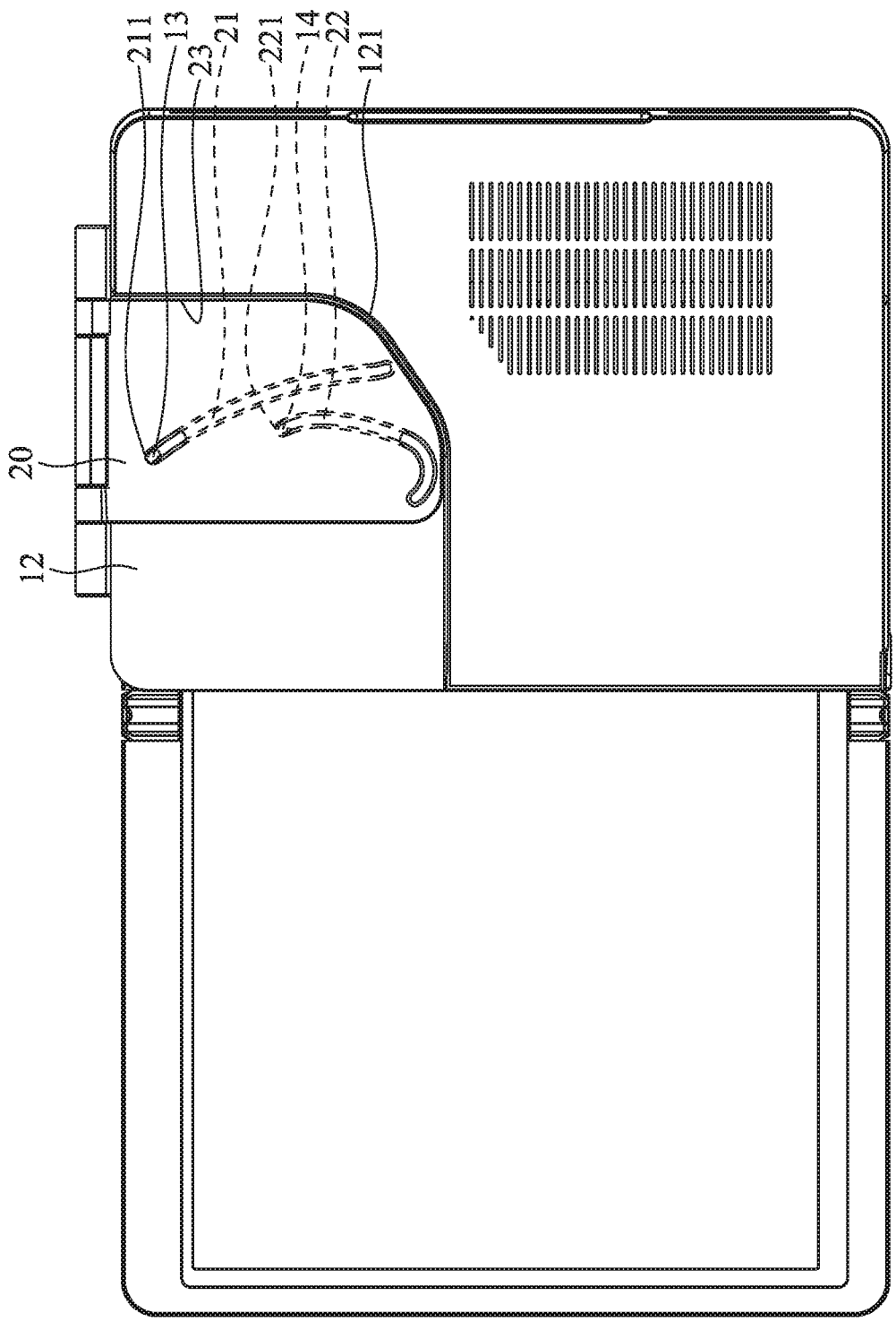
FIG. 5B illustrates a bottom view of the computer in the partially closed state according to some embodiments of the present disclosure.

Please refer to FIG. 5B, when the computer 100 is in the partially closed state, the first protrusion 13 of the keyboard 10 abuts the first sidewall 211 of the first groove 21 of the rotating plate 20, and the second protrusion 14 of the keyboard 10 abuts the first sidewall 221 of the second groove 22 of the rotating plate 20. Further, the rotating plate long side 23 of the rotating plate 20 abuts the recess portion side 121 of the keyboard recess portion 12. It should be noted that the portion indicated by the dashed line represents the portion that is actually shielded by other elements.

Specifically, the difference between the computer 100 in the partially closed state shown in FIG. 5A and FIG. 5B and the computer 100 in the completely closed state shown in FIG. 4A, FIG. 4B and FIG. 4C is that the screen 40 of the computer 100 in FIG. 5A and FIG. 5B is expanded, and the screen 40 of the computer 100 in FIG. 4A, FIG. 4B and FIG. 4C is unexpanded.

Figure 6A:
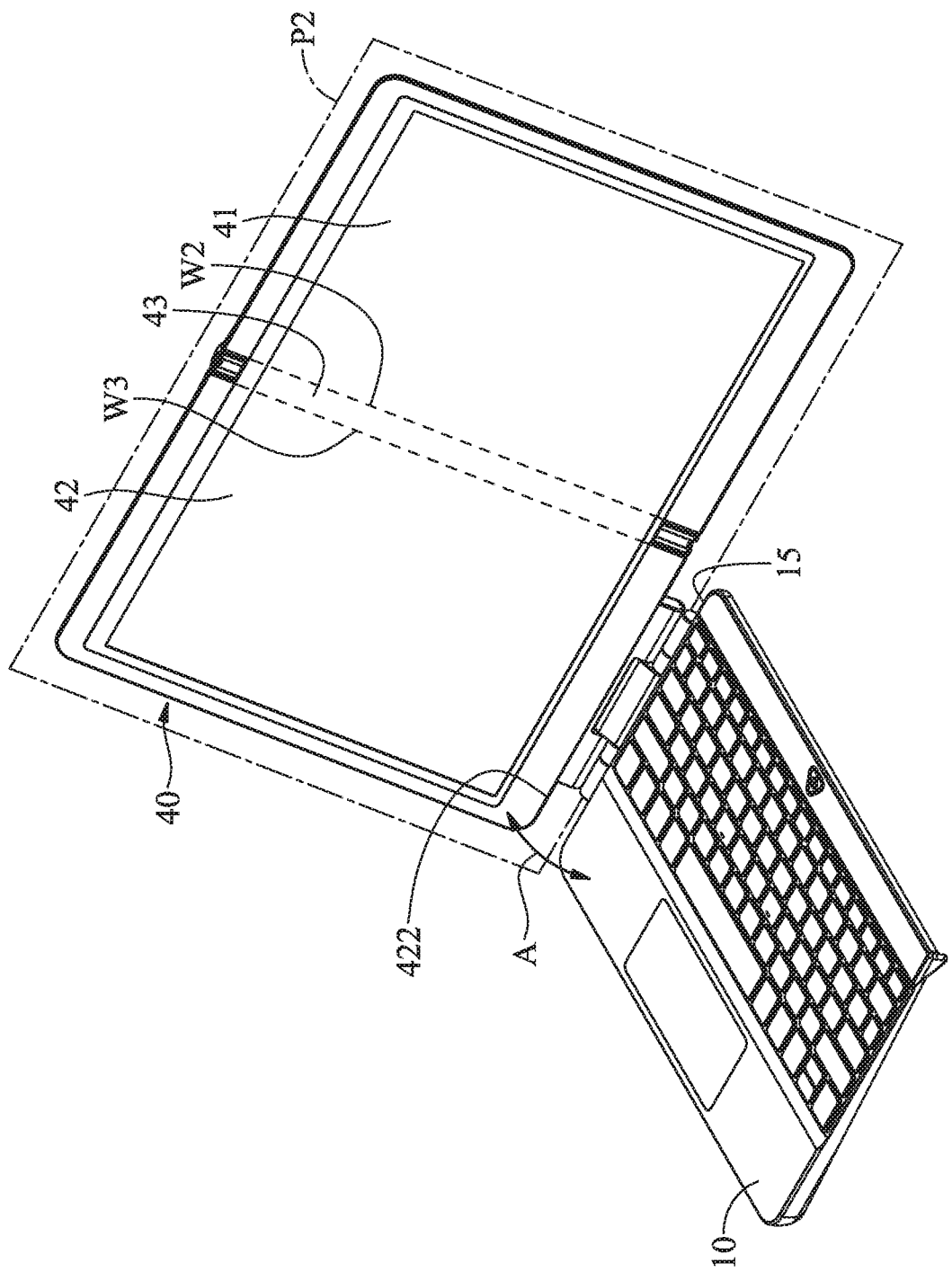
FIG. 6A illustrates a perspective view of the computer in a partially open state according to some embodiments of the present disclosure.

Please refer to FIG. 6A, FIG. 6A is a schematic view of the computer 100 in a partially open state. The computer 100 may transform between the partially closed state shown in FIG. 5A and FIG. 5B and the partially open state shown in FIG. 6A by rotating the pivot shaft 30.

As shown in FIG. 6A, when the computer 100 is in the partially open state, the first screen portion 41, the second screen portion 42 and the third screen portion 43 are located on a second plane P2, and the second plane P2 and the keyboard 10 are at a non-zero angle A. Moreover, the side 422 of the second screen portion 42 is parallel to the first side 15 of the keyboard 10. That is, the screen 40 is not in contact with the keyboard 10 and the screen 40 is expanded.

Figure 6B:
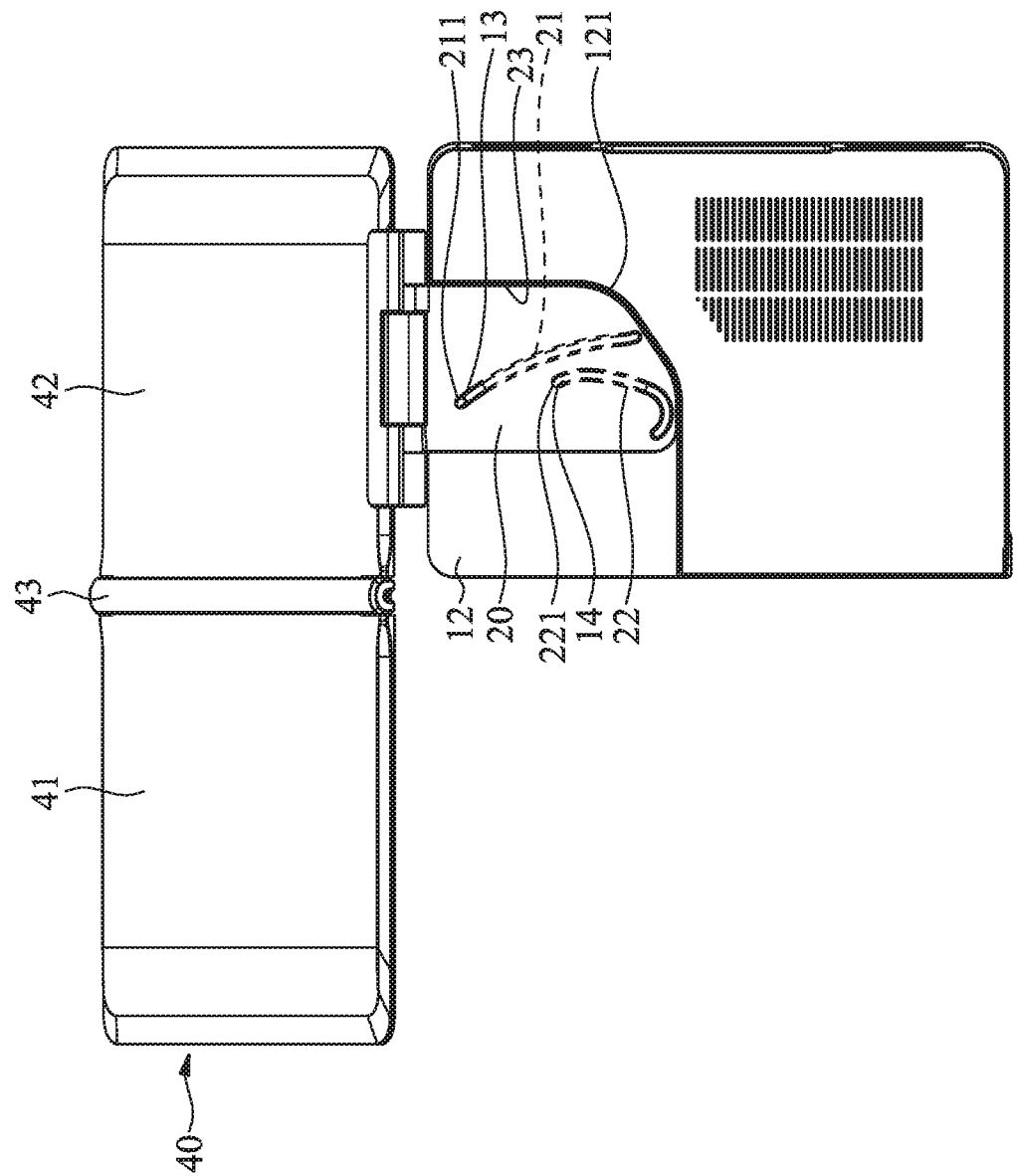
FIG. 6B illustrates a bottom view of the computer in the partially open state according to some embodiments of the present disclosure.

Please refer to FIG. 6B, when the computer 100 is in the partially open state, the first protrusion 13 of the keyboard 10 abuts the first sidewall 211 of the first groove 21 of the rotating plate 20, and the second protrusion 14 of the keyboard 10 abuts the first sidewall 221 of the second groove 22 of the rotating plate 20. Further, the rotating plate long side 23 of the rotating plate 20 abuts the recess portion side 121 of keyboard recess portion 12. It should be noted that the portion indicated by the dashed line represents the portion that is actually shielded by other elements.

Specifically, the difference between the computer 100 in the partially open state shown in FIG. 6A and FIG. 6B and the computer 100 in the partially closed state shown in FIG. 5A and FIG. 5B is that the screen 40 of the computer 100 in FIG. 6A and FIG. 6B is not in contact with the keyboard 10 (the screen 40 and the keyboard 10 are at the angle A), and the screen 40 of the computer 100 in FIG. 5A and FIG. 5B is in contact with the keyboard 10.

Figure 7A:
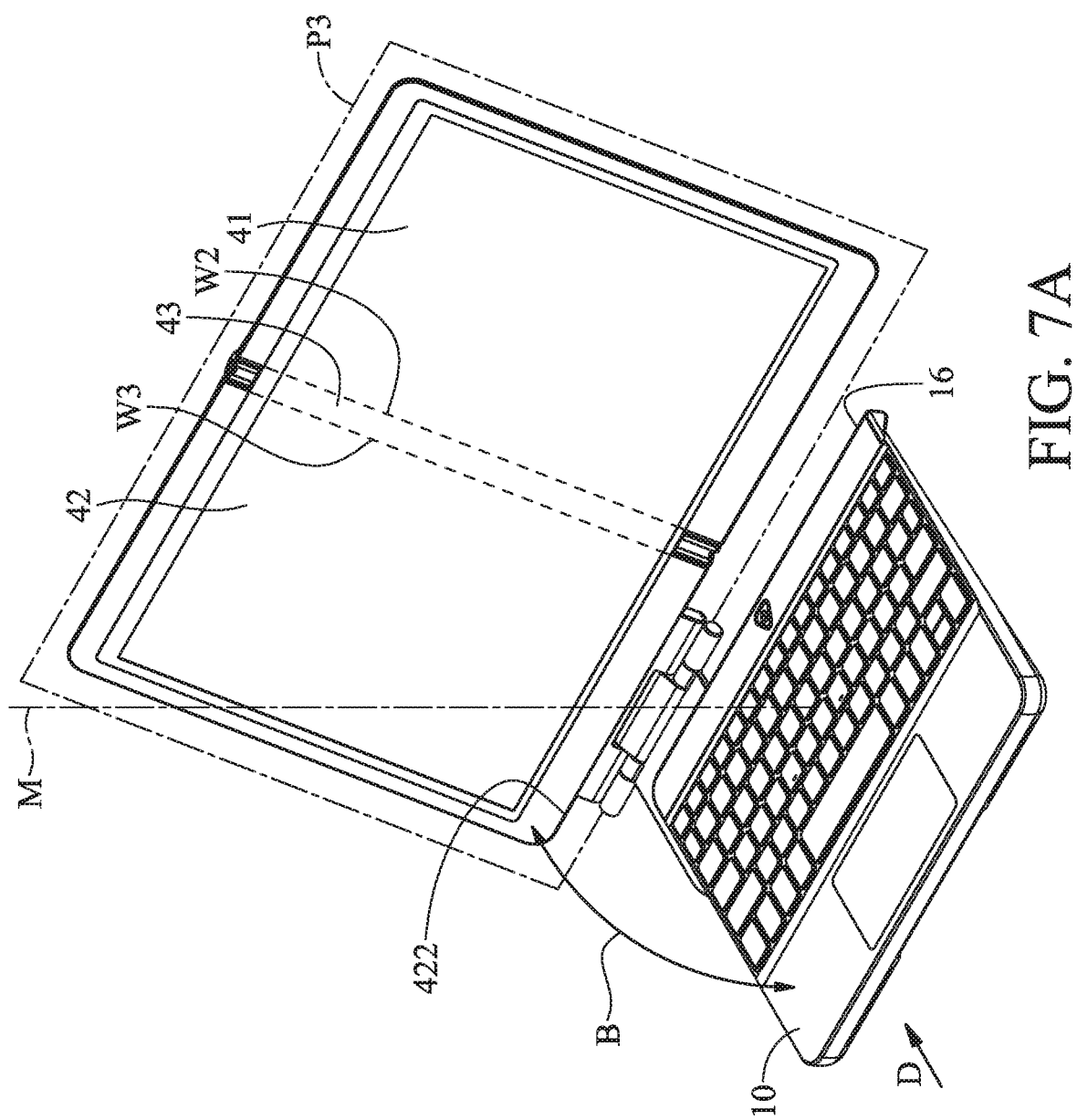
FIG. 7A illustrates a perspective view of the computer in a computer using state according to some embodiments of the present disclosure.
Figure 7B:
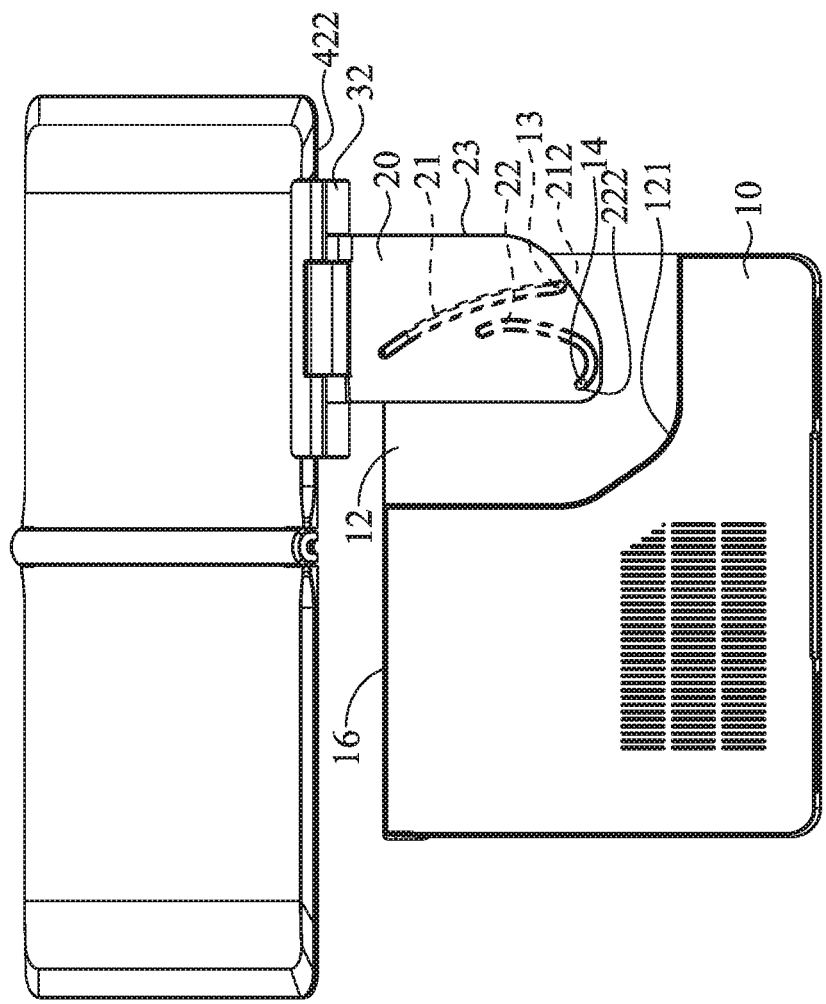
FIG. 7B illustrates a bottom view of the computer in the computer using state according to some embodiments of the present disclosure.

Please refer to FIG. 7A and FIG. 7B, FIG. 7A and FIG. 7B are schematic views of the computer 100 in a computer using state. Please refer to FIG. 7C and FIG. 7D, the computer 100 may transform between the partially open state shown in FIG. 6A and FIG. 6B and the computer using state shown in FIG. 7A and FIG. 7B by rotating the rotating plate 20.

Figure 7C:
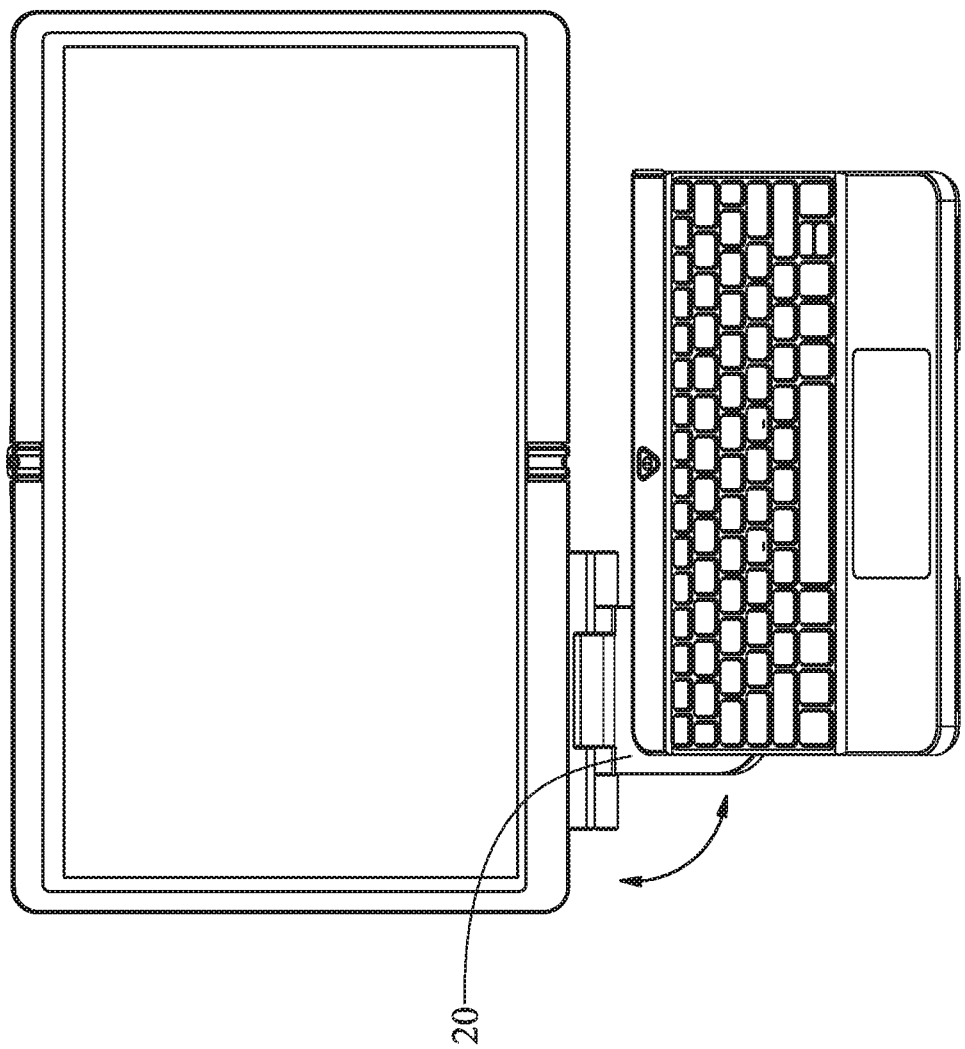
FIG. 7C illustrates a schematic view of the computer transforming between the partially open state shown in FIG. 6A and FIG. 6B and the computer using state shown in FIG. 7A and FIG. 7B by rotating a rotating plate in a direction according to some embodiments of the present disclosure.

As shown in FIG. 7C, in the present embodiment, the computer 100 may transform from the partially open state shown in FIG. 6A and FIG. 6B to the computer using state shown in FIG. 7A and FIG. 7B by rotating the rotating plate 20 clockwise; and the computer 100 may transform from the computer using state shown in FIG. 7A and FIG. 7B to the partially open state shown in FIG. 6A and FIG. 6B by rotating the rotating plate 20 counter-clockwise.

Figure 7D:
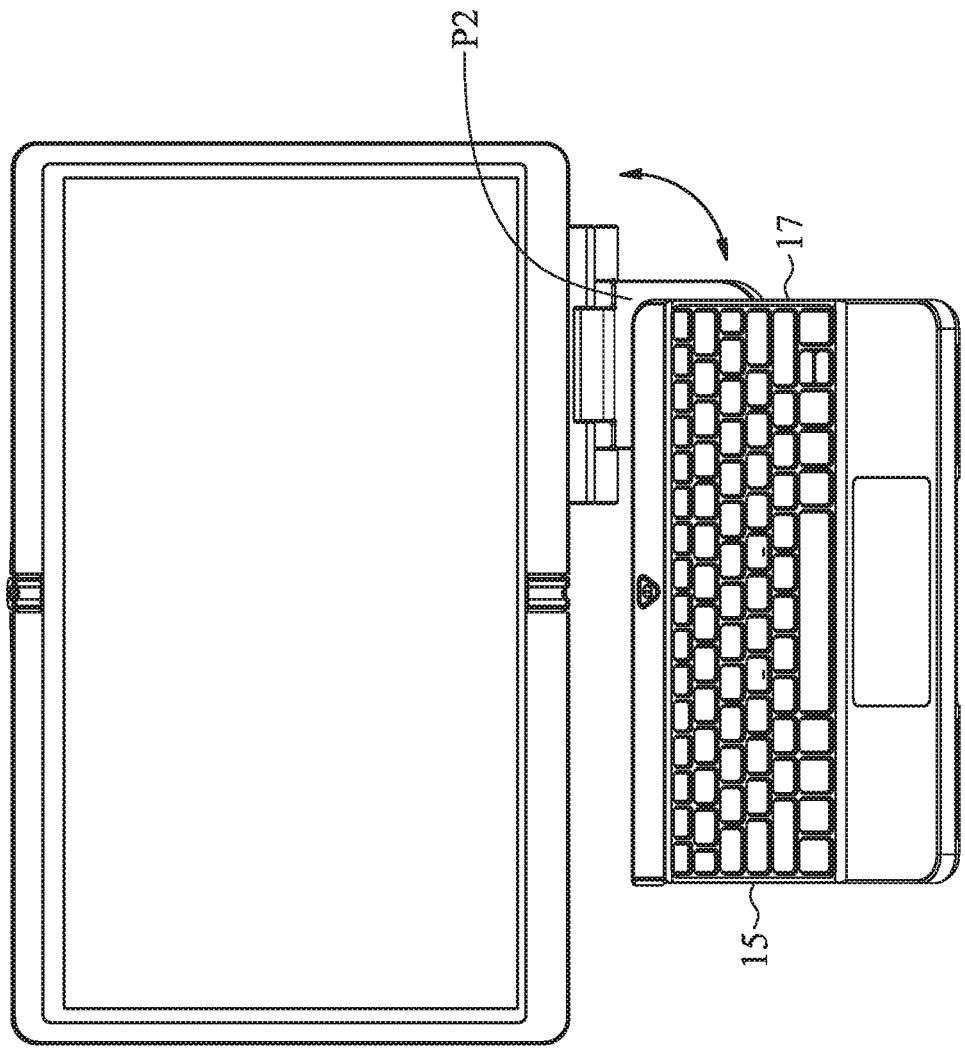
FIG. 7D illustrates a schematic view of the computer transforming between the partially open state shown in FIG. 6A and FIG. 6B and the computer using state shown in FIG. 7A and FIG. 7B by rotating the rotating plate in another direction according to some embodiments of the present disclosure.

As shown in FIG. 7D, in other modified embodiments of the present disclosure, the rotating plate 20 and the corresponding elements and structures are disposed adjacent to a third side 17 of the keyboard 10. The third side 17 is opposite to the first side 15. In the modified embodiment shown in FIG. 7D, the computer 100 may transform from the partially open state shown in FIG. 6A and FIG. 6B to computer using state shown in FIG. 7A and FIG. 7B by rotating the rotating plate 20 counter-clockwise; and the computer 100 may transform from the computer using state shown in FIG. 7A and FIG. 7B to the partially open state shown in FIG. 6A and FIG. 6B by rotating the rotating plate 20 clockwise.

As shown in FIG. 7A, when the computer 100 is in the computer using state, the first screen portion 41, the second screen portion 42 and the third screen portion 43 are located on a third plane P3, and the third plane P3 and the keyboard 10 are at a non-zero angle B. Wherein the angle B may be the same as or different from the angle A (please refer to FIG. 6A). In the computer using state, the side 422 of the second screen portion 42 is parallel to the second side 16 of the keyboard 10. Moreover, in the computer using state, the central axis M overlaps the screen pivot shaft 44 when observed along the direction D.

As shown in FIG. 7B, when the computer 100 is in the computer using state, the first protrusion 13 of the keyboard 10 abuts the second sidewall 212 of the first groove 21 of the rotating plate 20, and the second the protrusion 14 of the keyboard 10 abuts the second sidewall 222 of the second groove 22 of the rotating plate 20. Further, the rotating plate long side 23 of the rotating plate 20 does not abut the recess portion side 121 of the keyboard recess portion 12. It should be noted that the portion indicated by the dashed line represents the portion that is actually shielded by other elements.

Specifically, the difference between the computer 100 in the computer using state shown in FIG. 7A and FIG. 7B and the computer 100 in the partially open state shown in FIG. 6A and FIG. 6B is that the side 442 of the second screen portion 42 of the computer 100 is parallel to the second side 16 of the keyboard 10, and the side 442 of the second screen portion 42 the computer 100 is parallel to the first side 15 of the keyboard 10.

Figure 8:
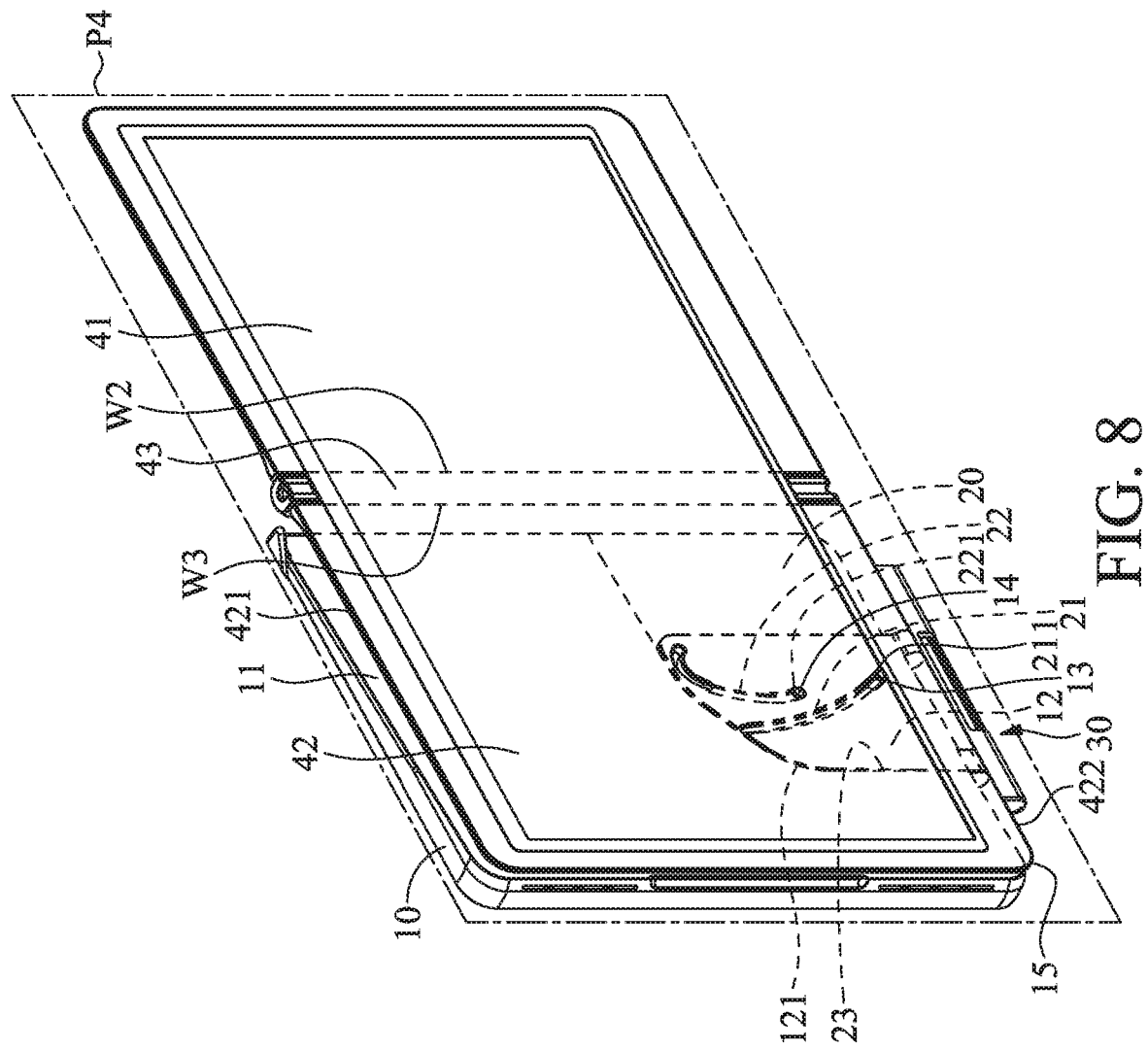
FIG. 8 illustrates a perspective view of a computer in a tablet using state according to some embodiments of the present disclosure.

Please refer to FIG. 8, FIG. 8 is a schematic view of the computer 100 in a tablet using state. The computer 100 may transform between the partially open state shown in FIG. 6A and FIG. 6B and the tablet using state shown in FIG. 8 by rotating the pivot shaft 30.

As shown in FIG. 8, when the computer 100 is in the tablet using state, the first screen portion 41, the second screen portion 42 and the third screen portion 43 are located on a fourth plane P4. The fourth plane P4 is substantially parallel to the keyboard 10, that is, when the computer 100 is in the tablet using state, the screen 40 is parallel to the keyboard 10. However, unlike the partially closed state shown in FIG. 5A, in the tablet using state shown in FIG. 8, the keyboard bottom surface 11 of the keyboard 10 abuts the back case 421 of the second screen portion 42. Moreover, in the tablet using state, the side 422 of the second screen portion 42 is parallel to the first side 15 of the keyboard 10.

Please continue to refer to FIG. 8, when the computer 100 is in the tablet using state, the first protrusion 13 of the keyboard 10 abuts the first sidewall 211 of the first groove 21 of the rotating plate 20, and the second the protrusion 14 of the keyboard 10 abuts the first sidewall 221 of the second groove 22 of the rotating plate 20. Further, the rotating plate long side 23 of the rotating plate 20 abuts the recess portion side 121 of the keyboard recess portion 12.

Specifically, the difference between the computer 100 in the tablet using state shown in FIG. 8 and the computer 100 in the partially open state shown in FIG. 6A and FIG. 6B is that the keyboard bottom surface 11 of the keyboard 10 of the computer 100 abuts the back case 421 of the second screen portion 42, while the computer 100 of FIG. 6A and FIG. 6B does not.

To sum up, the area of the screen 40 of the computer 100 of the present disclosure is more than twice the area of the keyboard 10 (having a large screen), and the area of the computer 100 of the present disclosure in the completely closed state is only the same as the area of the keyboard 10 (the effect of making it thinner and lighter). Therefore, the computer 100 of the present disclosure has a large screen and the effect of making it thinner and lighter. In other words, the computer 100 of the present disclosure solves the problem of a computer with a large screen but is easy to carry and move at the same time. In the present disclosure, the computer 100 of the present disclosure may be used as a personal computer or as a tablet by rotating the rotating plate 20 or the pivot shaft 30 of the computer 100.

Although the various examples of the present disclosure have been described above, it should be understood that they are presented by way of examples only, not as a limitation. In the case of not departing from the true spirit and scope of the present disclosure, many changes may be made according to the examples of the present disclosure. Thus, the width and scope of the present disclosure should not be limited by any of the above examples. Rather, the scope of the present disclosure should be defined in accordance with the following claims and their equivalents.

Although the present disclosure is shown and described based on one or more embodiments, but a person ordinary skilled in the art to which the present disclosure belongs may make some equivalent changes and modifications according to the reading and understanding of the specification and the accompanying drawings. Furthermore, although a particular feature of the present disclosure may disclose only one of the several embodiments, this feature may be combined with one or more other features of the other embodiments in any particular and special applications.

What is claimed is:

1. A computer, comprising:
   a keyboard;
   a rotating plate, movably disposed on the keyboard;
   a pivot shaft, connected to the rotating plate to move relative to the keyboard; and
   a screen, connected to the pivot shaft to move relative to the rotating plate, wherein the screen comprises:
   a first screen portion;
   a second screen portion, connected to the pivot shaft; and
   a screen pivot shaft, connected to the first screen portion and the second screen portion,
   wherein the first screen portion rotates relative to the second screen portion by the screen pivot shaft.

2. The computer as claimed in claim 1, wherein the keyboard comprises a first protrusion and a second protrusion, the rotating plate comprises a first groove and a second groove, the first protrusion is inserted into the first groove, the second protrusion is inserted into the second groove to restrict the movement of the rotating plate relative to the keyboard.

3. The computer as claimed in claim 2, wherein the first protrusion comprises a first protrusion head, the second protrusion comprises a second protrusion head, and a size of the first protrusion head is larger than a size of the first groove, a size of the second protrusion head is larger than a size of the second groove.

4. The computer as claimed in claim 1, wherein the keyboard comprises a keyboard recess portion, the keyboard recess portion has a recess portion side, the rotating plate comprises a rotating plate long side, and the rotating plate long side abuts the recess portion side.

5. The computer as claimed in claim 1, wherein the area of the first screen portion is substantially the same as the area of the keyboard, and the area of the second screen portion is substantially the same as the area of the keyboard.

6. The computer as claimed in claim 1, wherein the keyboard has a first side, the second portion has a side, and when the first screen portion is in contact with the keyboard, the first side is parallel to the side.

7. The computer as claimed in claim 1, wherein the keyboard has a keyboard bottom surface, the second screen portion comprises a back case, and the keyboard bottom surface is in contact with the back case by rotating the pivot shaft.

8. The computer as claimed in claim 1, wherein the screen further comprises a third screen portion connected to the first screen portion, the second screen portion and the screen pivot shaft, and the first screen portion rotates relative to the third screen portion by the screen pivot shaft.

9. The computer as claimed in claim 8, wherein the screen pivot shaft has a groove, and when the first screen portion is in contact with the keyboard, the groove accommodates a portion of the third screen portion.

* * * * *